(12) United States Patent
Hou (10) Patent No.: US 9,116,027 B2
(45) Date of Patent: Aug. 25, 2015

(54) FLOW METER

(71) Applicant: Yao-Sung Hou, Kaohsiung (TW)

(72) Inventor: Yao-Sung Hou, Kaohsiung (TW)

( * ) Notice: Subject to any disclaimer, the term of this patent is extended or adjusted under 35 U.S.C. 154(b) by 56 days.

(21) Appl. No.: 14/156,652

(22) Filed: Jan. 16, 2014

(65) Prior Publication Data

US 2015/0198469 A1    Jul. 16, 2015

(51) Int. Cl.
*G01F 1/64* (2006.01)
*G01F 1/58* (2006.01)

(52) U.S. Cl.
CPC .................................. *G01F 1/582* (2013.01)

(58) Field of Classification Search
CPC ............ G01F 1/64; G01F 15/14; G01F 1/28; G01F 1/05
USPC ..................... 73/861.11, 861.79, 861.74, 273
See application file for complete search history.

(56) References Cited

U.S. PATENT DOCUMENTS 7,980,127 B1 *   7/2011   Hou ................................ 73/273
8,418,567 B2 *   4/2013   Hou ............................. 73/861.74

FOREIGN PATENT DOCUMENTS

TW             M285697 U        1/2006

* cited by examiner

*Primary Examiner* — Jewel V Thompson
(74) *Attorney, Agent, or Firm* — Muncy, Geissler, Olds & Lowe, P.C.

(57) ABSTRACT

A flow meter comprises a flow tube, a magnetic switch and an adjustment assembly. The flow tube has two ends screwed respectively with a first fastening member and a second fastening member, and includes a jutting seat, a sleeve, a magnetic element and an elastic element inside. The magnetic switch is located on a lateral surface of the flow tube, and includes a magnetic induction member disposed inside to form magnetic induction with the magnetic element and a first gear rack. The adjustment assembly engages with the first gear rack for control. When the sleeve is pushed by liquid to generate displacement alteration, distance between the magnetic induction member and sleeve can be quickly adjusted by the adjustment assembly. In the event that the magnetic element in the sleeve exceeds the limit range of the magnetic induction member, a notice is sent to shut down electric power.

11 Claims, 10 Drawing Sheets

FLOW METER

FIELD OF THE INVENTION

The present invention relates to a flow meter and particularly to a flow meter installed on various types of liquid pipe to monitor and measure liquid flow flux.

BACKGROUND OF THE INVENTION

Figure 1:
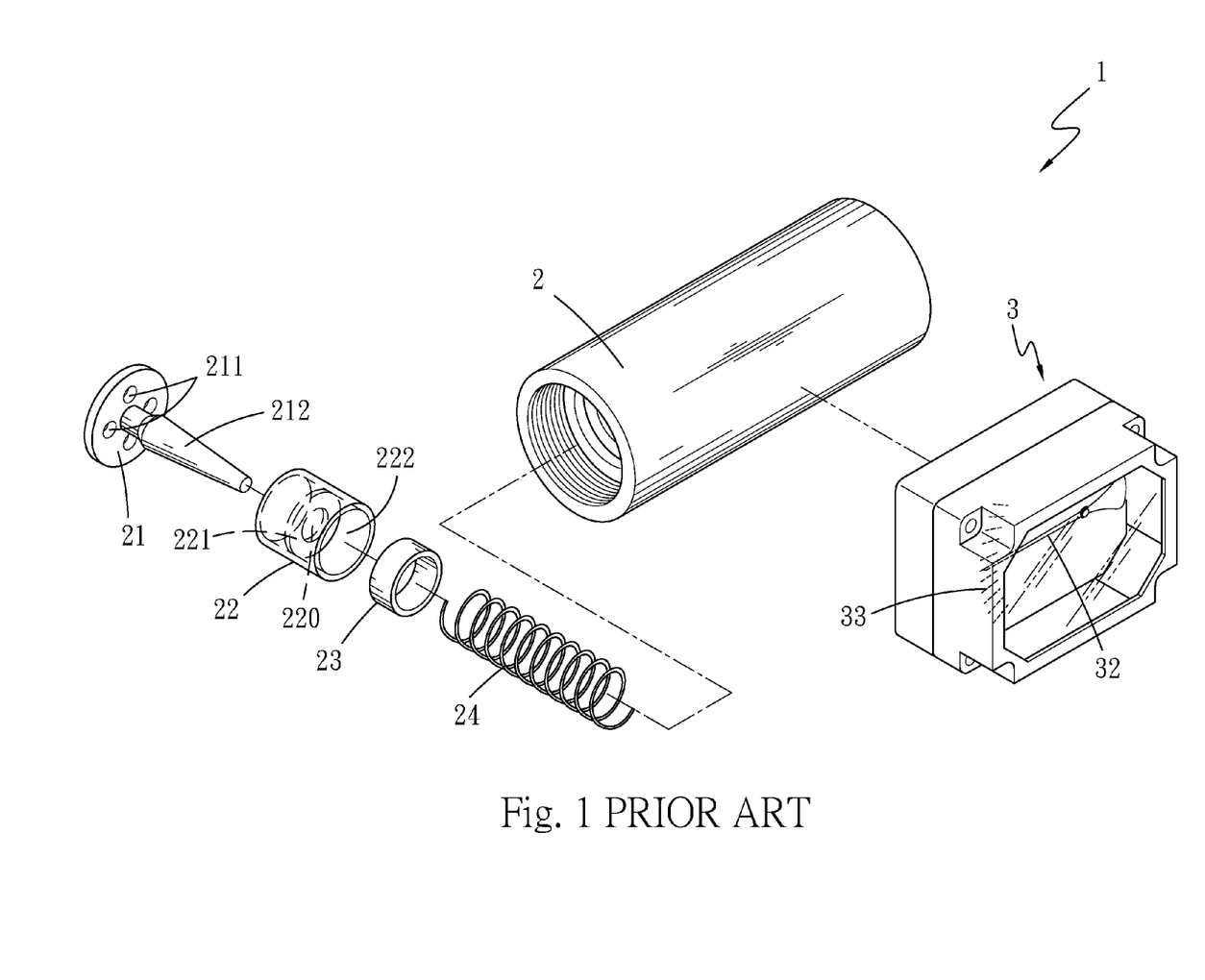
FIG. 1 is an exploded view of a conventional flow meter.
Figure 2:
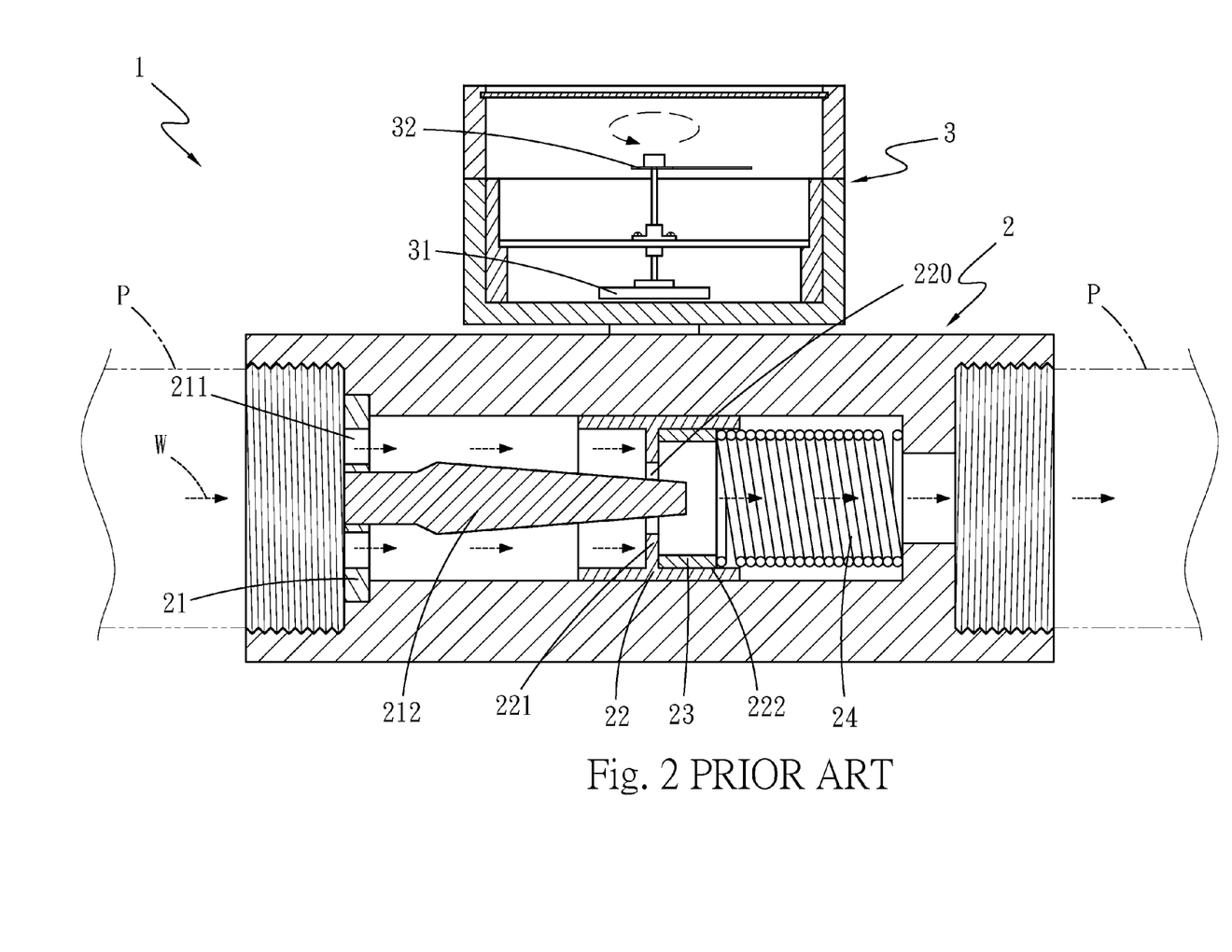
FIG. 2 is a schematic view according to FIG. 1 showing a liquid flow condition.

A conventional flow meter 1, such as Taiwan patent No. M285697 disclosed, referring to FIGS. 1 and 2, the flow meter 1 includes a hollow flow tube 2 and an indication meter 3 installed on an outer side of the flow tube 2. The flow tube 2 is connected to a pipe P for various types of liquid to flow, and includes with a conical seat 21, a movable spring sleeve 22 and a magnetic ring 23 that are installed therein. The conical seat 21 includes at least one aperture 211 and an extension 212 formed at a conical shape and extended from one side thereof. The movable spring sleeve 22 includes an inner annular surface 221 formed therein which includes an opening 220 run through by the extension 212, and an inner slot 222 formed therein opposing the conical seat 21 for accommodating the magnetic ring 23. The movable spring sleeve 22 has one end opposing the conical seat 21 to press a spring 24 against the inner side of the flow tube 2. The indication meter 3 includes a pointer 32 with a magnetic member 31 mounted thereon and a scale plate 33 corresponding to the pointer 32.

The flow meter 1, through liquid W in the flow tube 2 flowing through the aperture 211 of the conical seat 21, generates a pressure to push the movable spring sleeve 22 to move. Therefore, the mutual magnetic attraction between the magnetic ring 23 and magnetic element 31 will drive the pointer 32 to swivel, and the flow flux of the liquid W can be measured. However, the indication meter 3 is installed on the outer side of the flow tube 2 and requires an installation space. It is easily being blocked and masked in situations where a lot of pipes P are installed near the flow meter 1. Such situation produce inconvenience for operation people to check the indication meter 3. Besides, the indication meter 3 is used to monitor and measure the flow flux of the liquid W onsite. In practice, when the flow flux of the liquid W shown on the indication meter 3 is over a limit range flow of the liquid W has to be stopped. For setting the flow flux limitation, the indication meter 3 has to be detached to adjust the pointer 32 or the magnetic element 31, or be replaced by other detection meters to meet the required functions. Hence, aside from taking extra space and being blocked easily, the indication meter 3 of the conventional flow meter 1 also has disadvantages that it requires detachment for setting flow monitoring and cannot replace the scale plate 33 of different precisions immediately.

SUMMARY OF THE INVENTION

The present invention aims to provide a flow meter that has a magnetic switch to induct displacement amounts of a corresponding sleeve mounted in a flow tube generated by pushes of liquid and inform to shut down electric power when the displacement of the sleeve exceeds a limit range of a magnetic induction member in the magnetic switch.

To achieve the foregoing object the present invention provides a flow meter comprising a hollow flow tube, a magnetic switch and an adjustment assembly. The flow tube includes an inlet coupled and fastened with a first fastening member and an outlet coupled and fastened with a second fastening member, and a flow passage communicating with the inlet and the outlet. The flow tube includes a protrusive rod located on a first lateral surface of the flow tube to couple with a pointer, a jutting seat disposed in the first fastening member, a sleeve with one side run through by a strut extended from one side of the jutting seat and another side provided with a magnetic element located therein and an elastic element with two ends respectively abutting the sleeve and the an inner side of the second fastening member. The magnetic switch is installed on a second lateral surface of the flow tube adjacent to the first lateral surface, and includes a magnetic induction member therein to form magnetic induction with the magnetic element and an extension portion extended from the bottom thereof towards the first lateral surface of the flow tube. The extension portion has a slot run through by the protrusive rod and a first gear rack at a bottom edge of the slot. The adjustment assembly includes a gear set with a second gear rack at a bottom side thereof to engage with the first gear rack and a projection portion run through by the protrusive rod, a lid covering the magnetic switch and run through by the projection portion, a knob coupling on the protrusive rod, and a sealing cap screwed on the protrusive rod.

By means of the structure discussed above, the invention provides many advantages, notably:

1. Through the adjustment assembly of the invention, the distance between the magnetic induction member and the sleeve can be adjusted quickly to set the flow flux limitation of liquid according to different conditions, which is faster and easier than the conventional indication meter that has to be detached to do adjustment.

2. The pointer of the flow meter is installed on the flow tube and takes a smaller space than the conventional indication meter, and also is easier to observe without being blocked by other pipes.

3. The pointer can install scale plates of different precisions according to different conditions, and the replacement of the scale plates is simpler than the conventional indication meter which has to be detached for replacement.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 3:
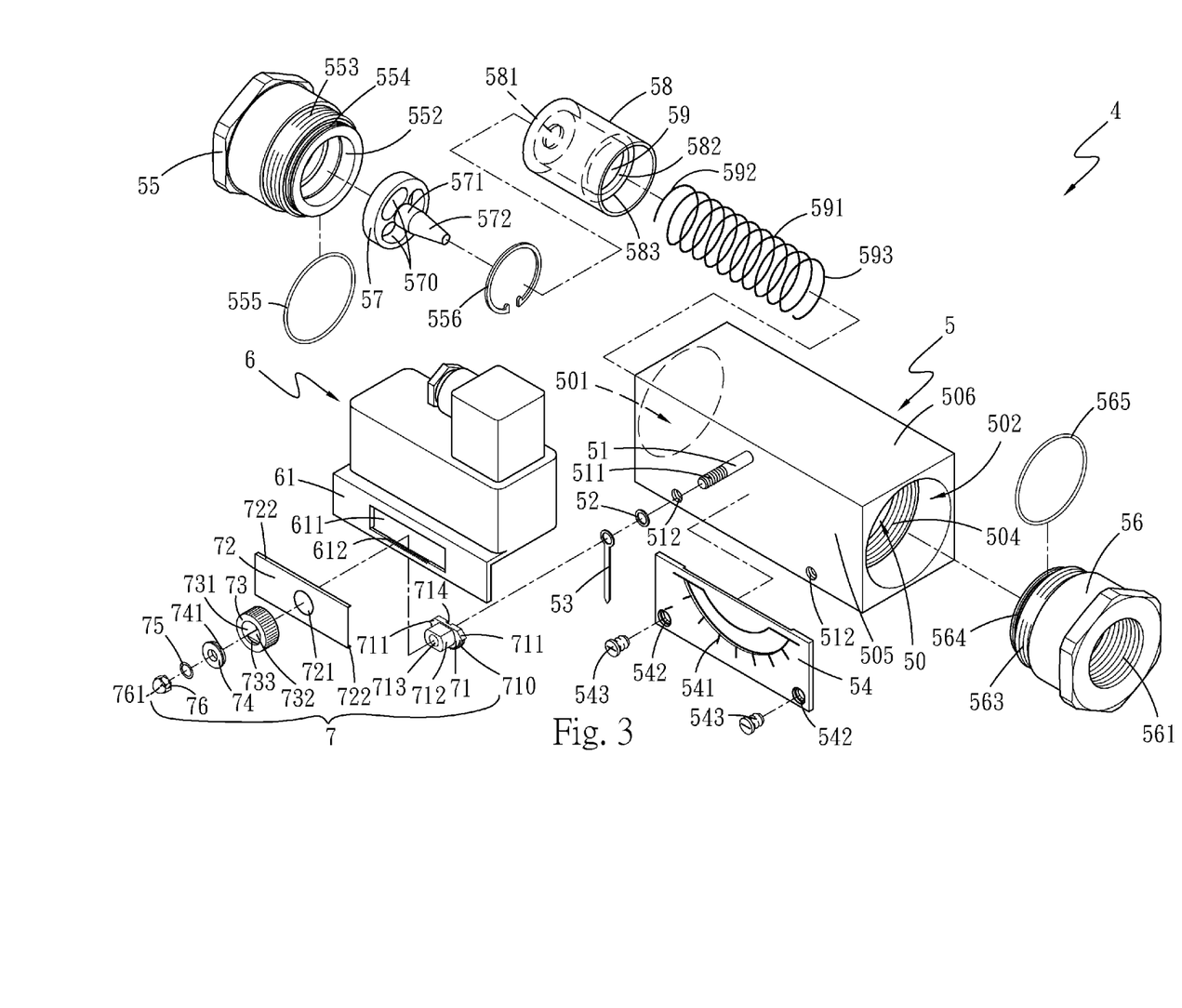
FIG. 3 is an exploded view of a flow meter of the invention.
Figure 4A:
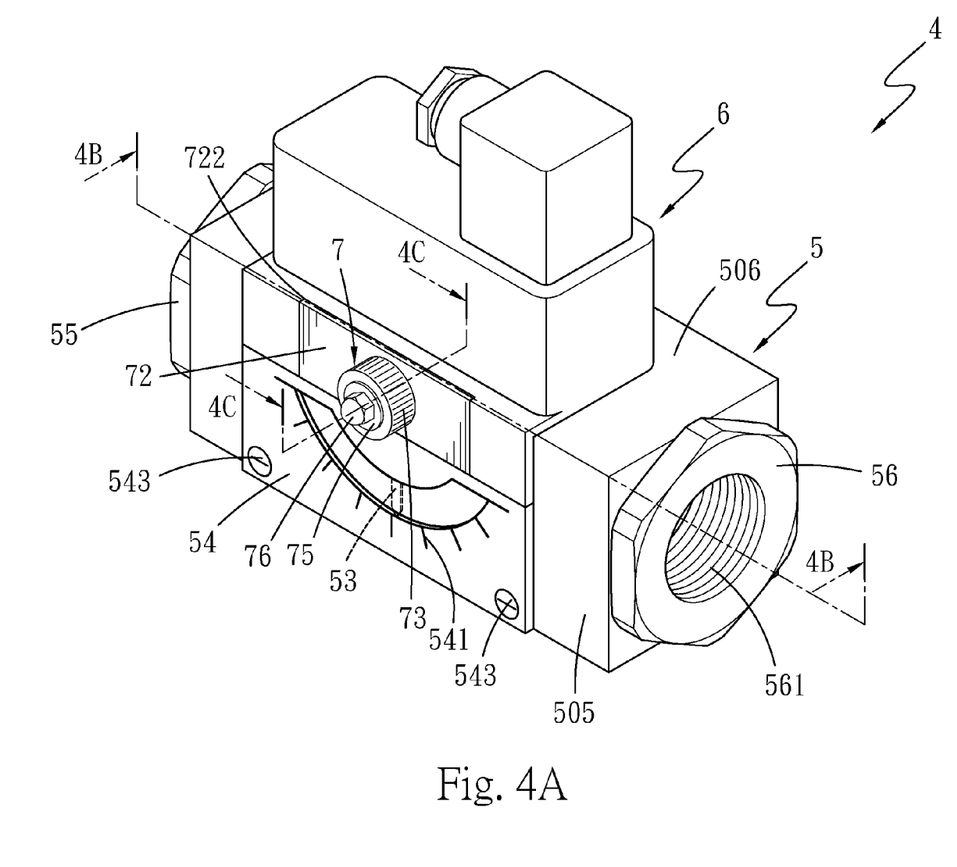
FIG. 4A is a perspective view of the flow meter of the invention.
Figure 4B:
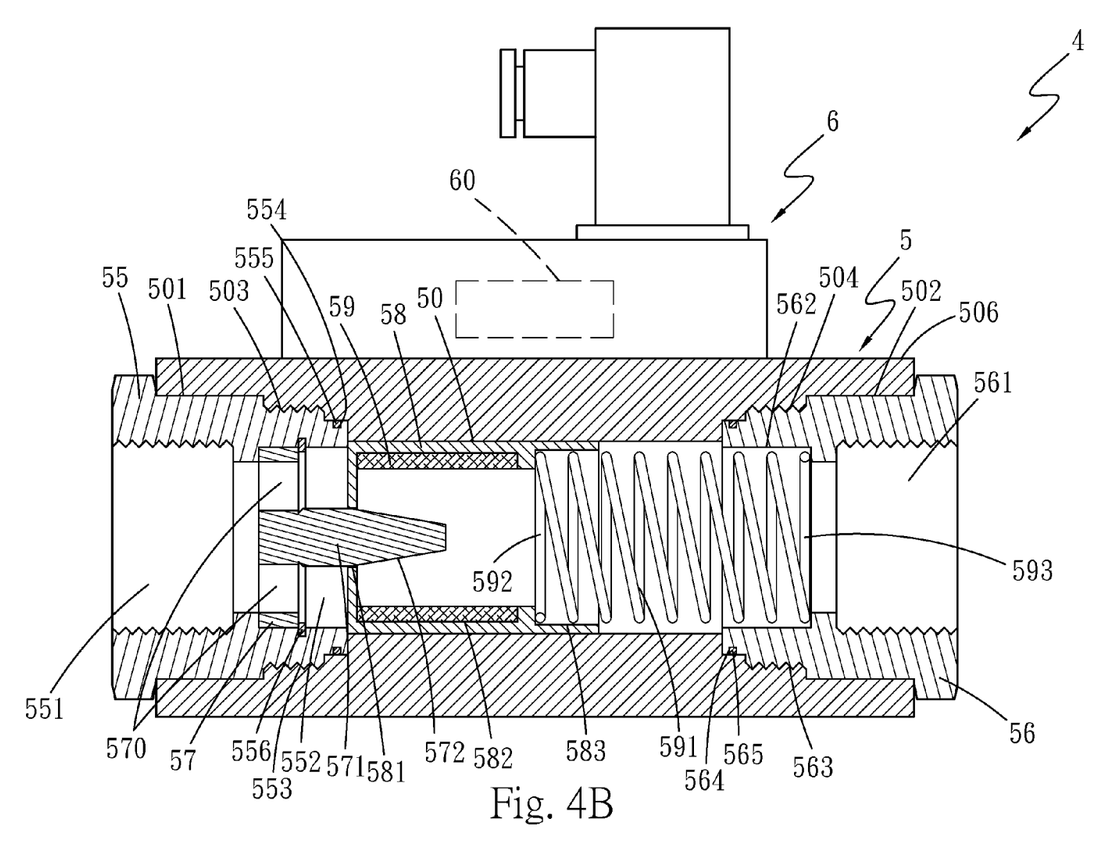
FIG. 4B is a cross section view taken on line 4B-4B of FIG. 4A.
Figure 4C:
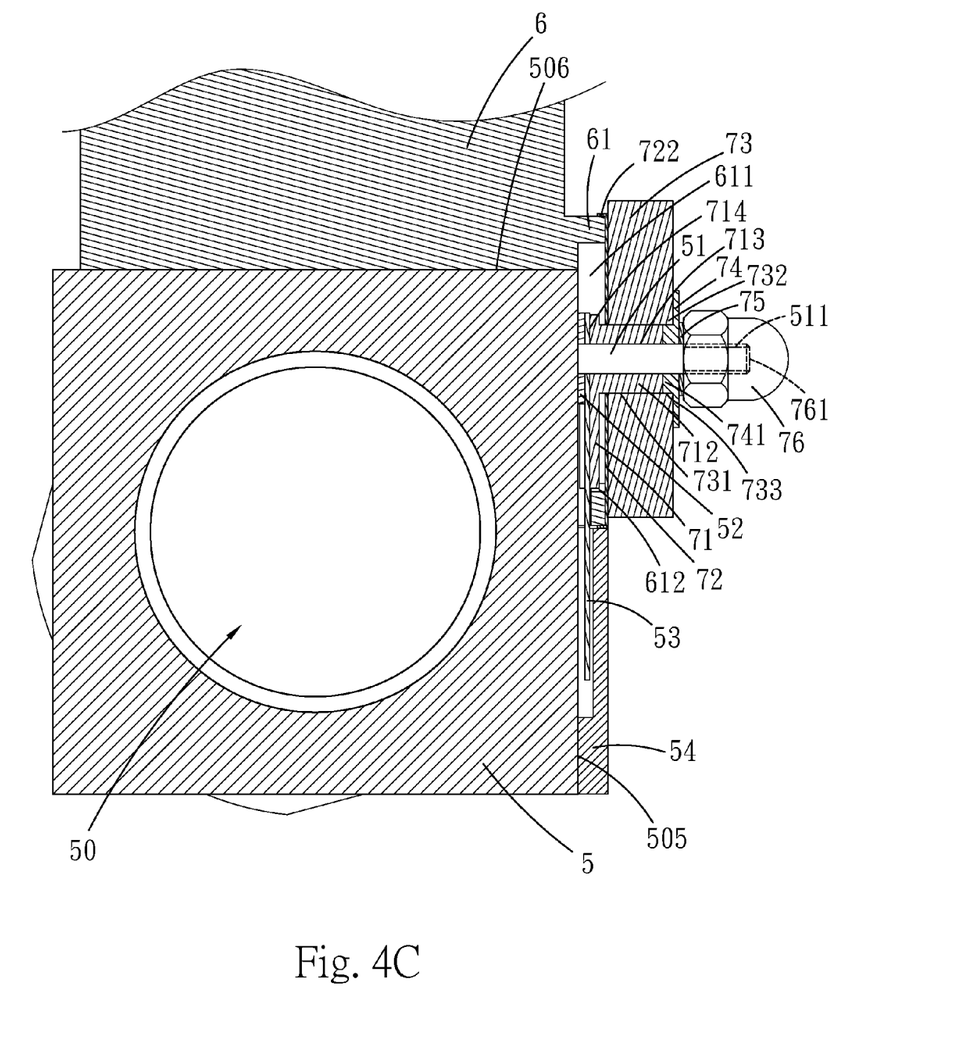
FIG. 4C is a cross section view taken on line 4C-4C of FIG. 4A.

Please referring to FIGS. 3 through 4C, the present invention aims to provide a flow meter 4 comprising a flow tube 5, a magnetic switch 6 and a an adjustment assembly 7.

The flow tube 5 includes an inlet 501, an outlet 502 and a flow passage 50 communicating with the inlet 501 and the outlet 502. The inlet 501 and the outlet 502 have respectively a first internal thread 503 and a second internal thread 504. The flow tube 5 includes a first lateral surface 505, a protrusive rod 51 extending from the first lateral surface 505, two fastening holes 512 at two opposing sides of a lower portion of the first lateral surface 505 and a scale plate 54 installed on the first lateral surface 505. The protrusive rod 51 has an external thread 511 formed at one end thereof and is coupled with a first washer 52 and a pointer 53. The scale plate 54 includes a scale 541 formed thereon and two screw holes 542 at two opposing sides thereof corresponding to the two fastening holes 512 and run through by a plurality of fastening elements 543 such as screws, so that the scale plate 54 can be fasten onto the first lateral surface 505 of the flow tube 5. The inlet 501 is coupled with a first fastening member 55 which includes a first inner screw hole 551 at one end thereof for holding an inlet pipe P1 and a first accommodating space 552 at another end thereof facing the inlet 501 and communicating with the first inner screw hole 551. The first fastening member 55 further includes a first external thread 553 for screwing with the first internal thread 503, and a first annular groove 554 for a first sealing washer 555 to couple on. The outlet 502 is coupled with a second fastening member 56 which includes a second inner screw hole 561 at one end thereof for holding an outlet pipe P2, and a second accommodating space 562 at another end thereof facing the outlet 502 and communicating with the second inner screw hole 561. The second fastening member 56 further includes a second external thread 563 for screwing with the second internal thread 504, and a second annular groove 564 for a second sealing washer 565 to couple on. Hence the first fastening member 55 and the second fastening member 56 are screwed and fastened respectively to the inlet 501 and the outlet 502 respectively. The flow tube 5 further includes a jutting seat 57, a sleeve 58, a magnetic element 59 and an elastic element 591 installed therein. The jutting seat 57 is disposed in the first accommodating space 552 and includes a strut 571 extended from one side thereof towards the sleeve 58, a conical protrusive portion 572 formed at one end of the strut 571 and tapered towards the sleeve 58 gradually, at least one aperture 570 and a C-shaped clip ring 556. In this embodiment there are three apertures 570 communicating with the first inner screw hole 551 and the first accommodating space 552. The jutting seat 57 is fastened and held in the first accommodating space 552 by using the C-shaped clip ring 556 to abut an inner side of the first fastening member 55. The sleeve 58 includes one end abutting an outer rim of the first fastening member 55, a through hole 581 at the one end thereof run through by the strut 571 to form a gap therebetween, a housing trough 582 communicating with the through hole 581, and an indented circular opening 583 formed in the housing trough 582 and facing the outlet 502. The magnetic element 59 is a magnet and is held in the housing trough 582. The elastic element 591 is a spring with one end 592 thereof abutting in the indented circular opening 583 of the sleeve 58 and another end 593 thereof abutting a inner side of the second accommodating space 562 of the second fastening member 56.

The magnetic switch 6 is installed on a second lateral surface 506 of the flow tube 5 adjacent to the first lateral surface 505, and includes a magnetic induction member 60 disposed therein to form induction with the magnetic element 59, and an extension portion 61 extended from the bottom thereof towards the first lateral surface 505 of the flow tube 5. The extension portion 61 includes a slot 611 formed thereon and run through by the protrusive rod 51, and a first gear rack 612 formed on a bottom edge of the slot 611. The adjustment assembly 7 includes a gear set 71, a lid 72, a knob 73 and a sealing cap 76. The gear set 71 includes a second gear rack 710 at a bottom side thereof to engage with the first gear rack 612, two detent portions 711 at two opposite ends thereof to confine movement of the gear set 71 within the range of the first gear rack 612 by latching, an projection portion 712 at one side thereof passing through the slot 611, a hole 713 formed in the projection portion 712 and run through by the protrusive rod 51, and a channel 714 opposite to the projection portion 712 to latch and drive the pointer 53 to rotate. The lid 72 includes an opening 721 corresponding to the slot 611 of the extension portion 61 and run through by the projection portion 712, and two latch edges 722 at an upper side and a lower side respectively to couple and latch on the extension portion 61. The knob 73 includes an orifice 731 run through by the projection portion 712 which is coupled on the protrusive rod 51, two detent blocks 732 upper end and a lower end of the orifice 731 respectively for latching the projection portion 712, and a recess 733 in front of the detent blocks 732. Further, a second washer 74 and a third washer 75 in front of the knob 73 are coupled on the protrusive rod 51 in sequence. The second washer 74 has a flange 741 to wedge in the recess 733 of the knob 73. The sealing cap 76 includes an inner screw hole 761 facing the protrusive rod 51 to screw with the external thread 511 of the protrusive rod 51. By screwing the sealing cap 76, the third washer 75, the second washer 74 and the knob 73 are securely fastened onto the protrusive rod 51. Moreover, the knob 73 abuts the lid 72 and is anchored on the extension portion 61 of the magnetic switch 6.

Figure 5:
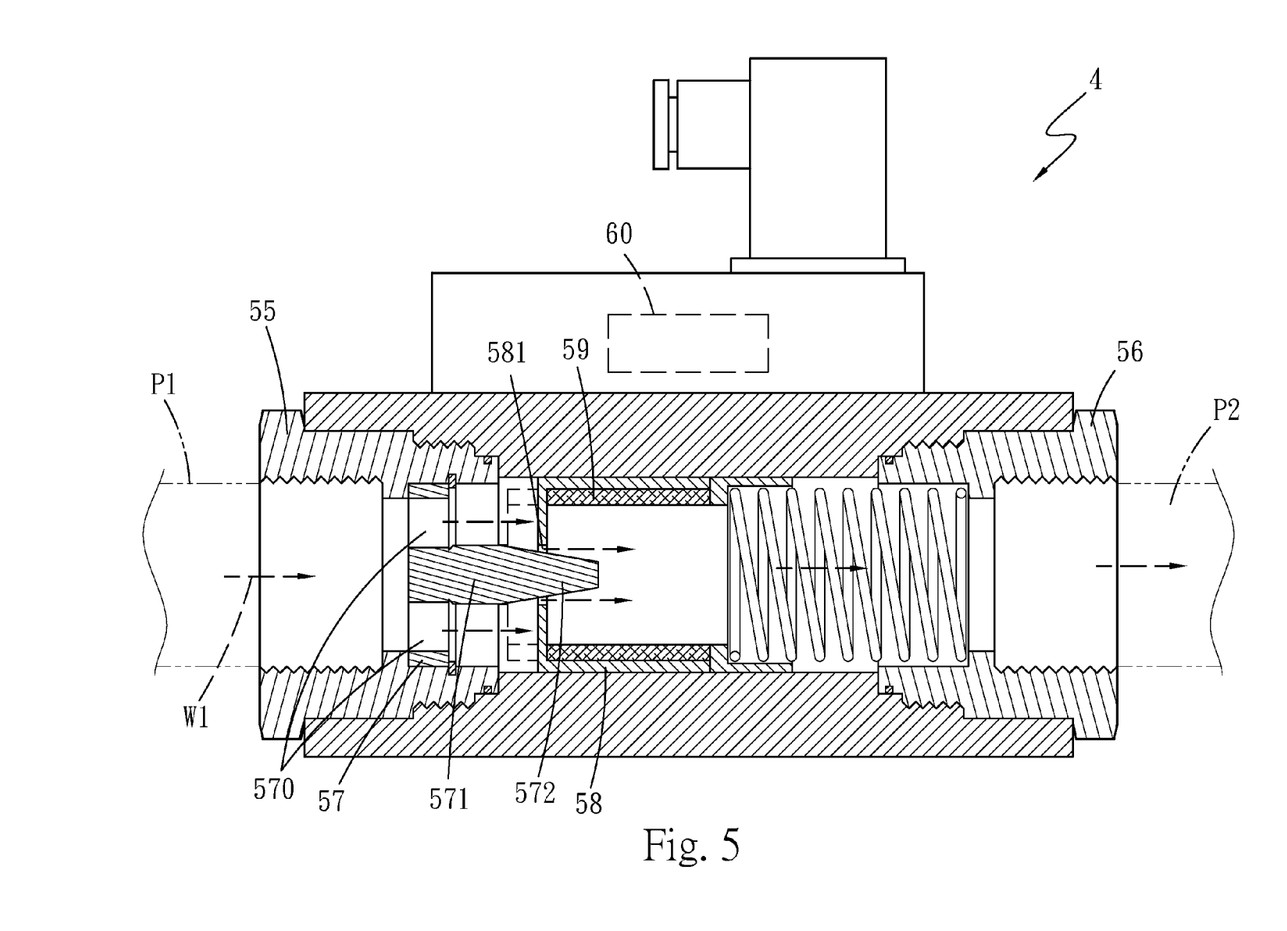
FIG. 5 is a schematic view of the flow meter of the invention showing a liquid flow condition.

Through assembling the aforesaid structural elements for using, referring to FIG. 5, the first fastening member 55 and the second fastening member 56 are respectively connected with the inlet pipe P1 and the outlet pipe P2 of liquid W1 (shown by arrows in FIG. 5). The liquid W1 from the inlet pipe P1 flows into the first fastening member 55, and passes through the aperture 570 of the jutting seat 57, and generates pressure during flowing to push the sleeve 58 to move transversely. Then, the liquid W1 flows into the sleeve 58 through the gap formed between the through hole 581 and the protrusive portion 572 of the strut 571, then flows out through the second fastening member 56. When the flow flux of the liquid W1 increases, the displacement of the sleeve 58 pushed by the liquid W1 also increases, hence a greater gap between the protrusive portion 572 and the through hole 581 is formed. When the liquid W1 flows through the flow meter 4, it pushes the sleeve 58 to move, the magnetic induction member 60 outside the flow tube 5 generates corresponding induction against the magnetic element 59. In the event that the displacement of the sleeve 58 over the set position of the magnetic induction member 60 the power source is ordered to shut down, hence the magnetic induction member 60 can set the allowable maximum flow flux limitation of the liquid W1.

Figure 6:
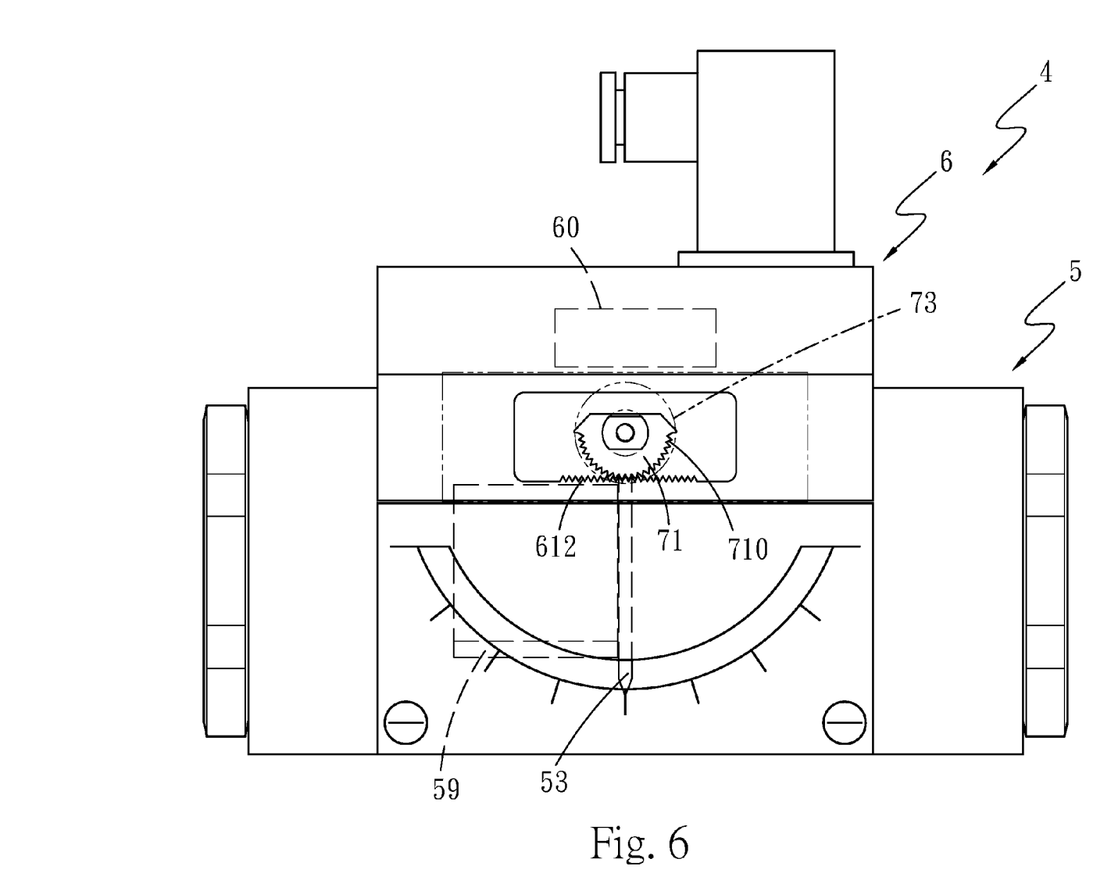
FIG. 6 is a schematic view of the invention showing a magnetic induction member and a magnetic element in an induction condition.
Figure 7A:
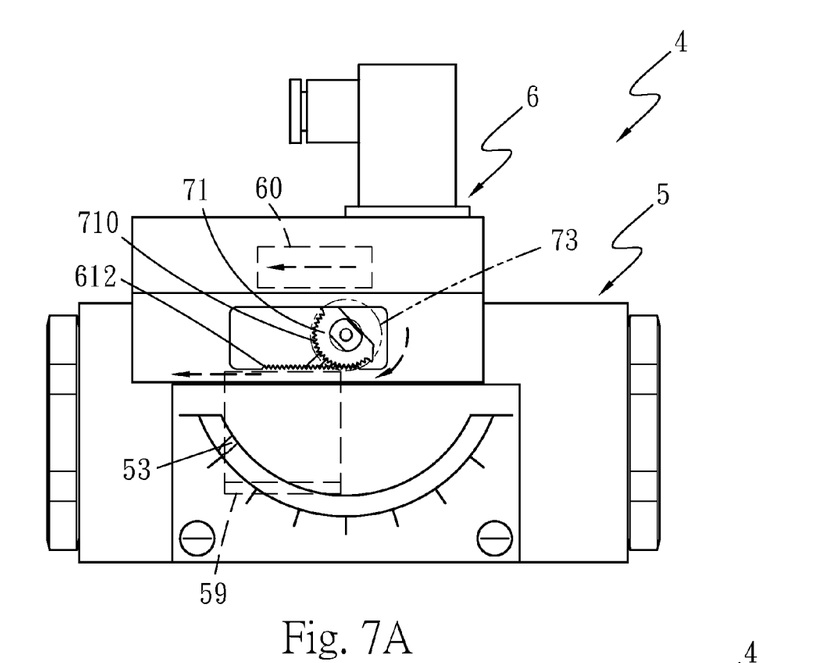
FIG. 7A is a schematic view of the invention showing the magnetic switch in a leftward adjustment movement.

The flow flux limitation of the flow meter 4 can be adjusted onsite. Please referring to FIGS. 6 through 7B, by adjusting the knob 73 to control rotation of the gear set 71 and the pointer 53, and through engagement of the first gear rack 612 and the second gear rack 710 of the gear set 71, the magnetic switch 6 outside the flow tube 5 can be moved leftward or rightward to change a induction distance between the magnetic induction member 60 and the magnetic element 59.

Figure 7B:
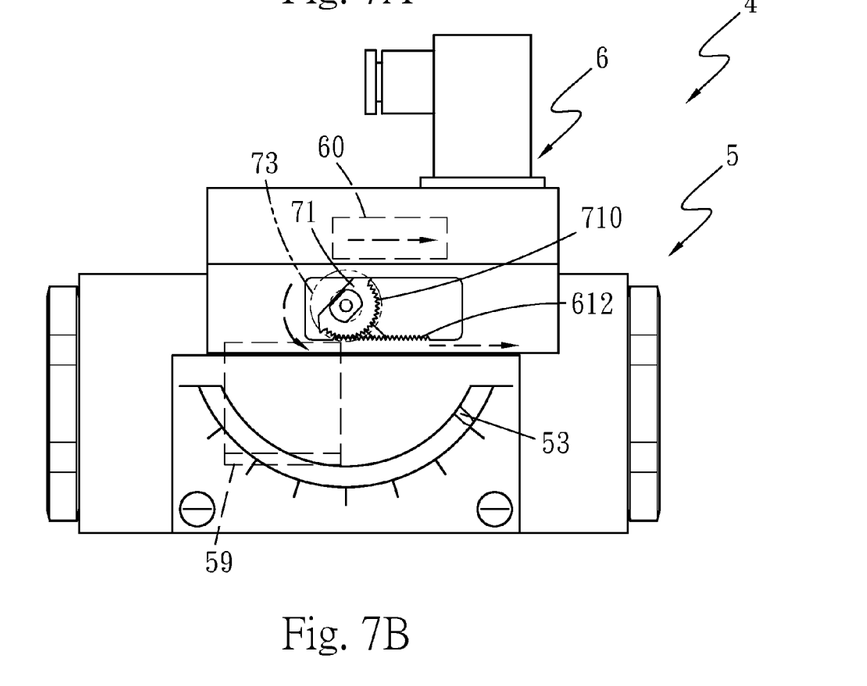
FIG. 7B is a schematic view of the invention showing the magnetic switch in a rightward adjustment movement.

When the induction distance expands, the allowable flow flux limitation of the liquid W1 also is enlarged. When the flow flux of the liquid W1 exceeds the allowable flow flux limitation the magnetic switch 6 generates an electric signal to shut down the electric power source.

Figure 8:
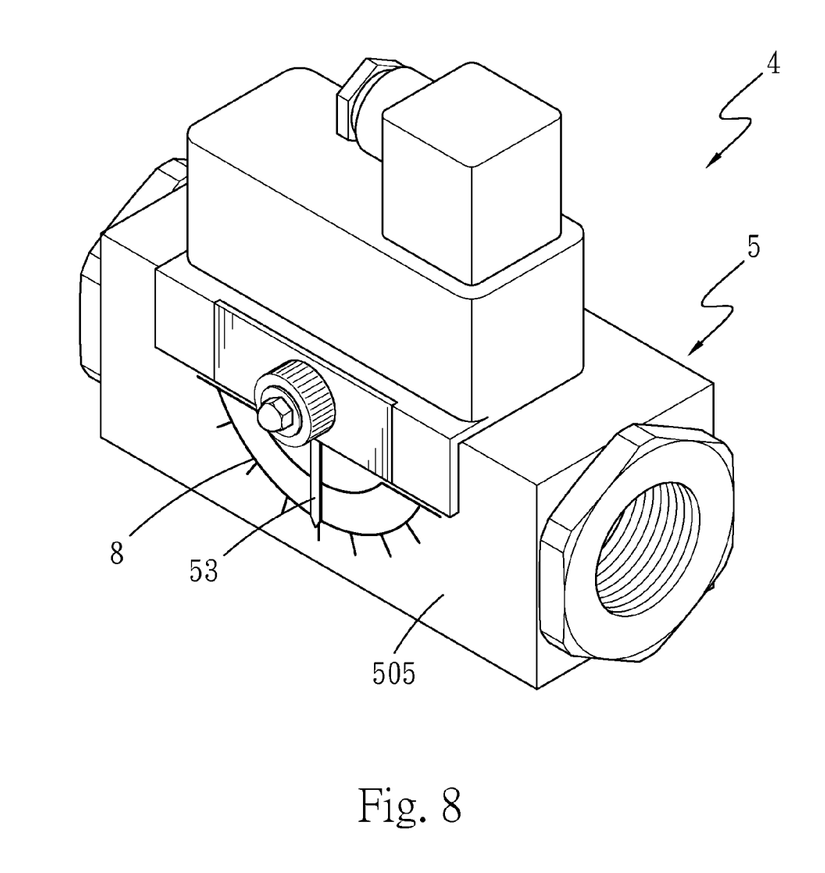
FIG. 8 is a schematic view of another embodiment of the flow meter of the invention.

The scale plate 54 of the invention can be replaced in different precision degrees according to different types of the liquid W1 to get more accurate allowable flow flux limitation. In another embodiment of the flow meter 4 of the invention, the scale plate 54 is not necessary. Instead, scales 8 can be directly formed on the first lateral surface 505 of the flow tube 5 corresponding to the rotation range of the pointer 53, as shown in FIG. 8. The scales 8 thus formed also provides a function same as the function of the scale plate 54 for observing the rotation degree of the pointer 53.

In short, the flow meter 4 of the invention has the pointer 53 installed on the first lateral surface 505 of the flow tube 5 which takes a smaller space and is less likely to be blocked from viewing when comparing with the conventional indication meter. Hence the flow meter 4 of the invention can be observed clearly for operation people, and is adaptable to the inlet pipe P1 and the outlet pipe P2 of various types of liquid W1, and also provides other advantages such as easier and quicker setting and adjustment of the flow flux limitation of the liquid W1.

What is claimed is:

1. A flow meter, comprising:
a flow tube including an inlet coupled with a first fastening member, an outlet coupled with a second fastening member, a flow passage communicating with the inlet and the outlet, a protrusive rod located on a first lateral surface of the flow tube to couple with a pointer, a jutting seat disposed in the first fastening member, a sleeve with one side run through by a strut extended from one side of the jutting seat and another side provided with a magnetic element located therein, and an elastic element with two ends abutting the sleeve and an inner side of the second fastening member respectively;
a magnetic switch which is installed on a second lateral surface of the flow tube adjacent to the first lateral surface and includes a magnetic induction member therein to form magnetic induction with the magnetic element and an extension portion extended from the bottom thereof towards the first lateral surface of the flow tube, the extension portion including a slot run through by the protrusive rod and a first gear rack located at a bottom edge of the slot; and
an adjustment assembly including a gear set with a second gear rack at the bottom side thereof to engage with the first gear rack and a projection portion run through by the protrusive rod, a lid covering the magnetic switch and including an opening run through by the projection portion, a knob coupling on the projection portion and rotatable for turning the pointer, and a sealing cap fastened to the protrusive rod by screwing such that the knob and the extension portion of the magnetic switch are latched on the protrusive rod.

2. The flow meter of claim 1, wherein the inlet and the outlet include respectively a first internal thread and a second internal thread, the first fastening member including a first inner screw hole at one end thereof for holding an inlet pipe, a first accommodating space at another end thereof facing the inlet and communicating with the first inner screw hole, a first external thread for screwing with the first internal thread, and a first annular groove for a first sealing washer to couple on, the second fastening member including a second inner screw hole at one end thereof for holding an outlet pipe, a second accommodating space at another end thereof facing the outlet and communicating with the second inner screw hole, a second external thread for screwing with the second internal thread, and a second annular groove for a second sealing washer to couple on.

3. The flow meter of claim 1, wherein the jutting seat includes a conical protrusive portion extended from the strut and gradually tapered towards the sleeve, at least one aperture communicating with the first inner screw hole and the first accommodating space, and a C-shaped clip ring abutting an inner side of the first fastening member; the sleeve including one end abutting an outer rim of the first fastening member, a through hole at one end thereof run through by the strut to form a gap therebetween, a housing trough at another end thereof communicating with the through hole, and an indented circular opening formed in the housing trough and facing the outlet.

4. The flow meter of claim 3, wherein the magnetic element is a magnet and is held in the housing trough.

5. The flow meter of claim 3, wherein the elastic element is a spring and includes one end abutting the indented circular opening of the sleeve and another end abutting an inner side of the second fastening member.

6. The flow meter of claim 1, wherein the gear set includes two detent portions at two opposing ends thereof to confine movement of the gear set in the range of the first gear rack, a hole formed in the projection portion and run through by the protrusive rod, and a channel opposite to the projection portion to latch and drive the pointer to rotate.

7. The flow meter of claim 1, wherein the lid includes two latch edges at an upper side and a lower side thereof respectively to latch on an upper end and a lower end of the extension portion.

8. The flow meter of claim 1, wherein the knob includes an orifice run through by the projection portion of the gear set, two detent blocks at an upper end and a lower end of the orifice for latching the projection portion, and a recess in front of the two detent blocks, the protrusive rod being coupled with a second washer and a third washer coupled at a front end of the second washer, the second washer including a flange wedged in the recess of the knob.

9. The flow meter of claim 1, wherein the protrusive rod includes an external thread at one end thereof coupled with a first washer and the pointer, the sealing cap including an inner screw hole screwed by the external thread of the protrusive rod to securely fasten the knob onto the protrusive rod.

10. The flow meter of claim 1, wherein the flow tube includes two fastening holes at two opposing sides of a lower portion of the first lateral surface and a scale plate installed on the first lateral surface, the scale plate including scales formed thereon and two screw holes at two opposing sides thereof corresponding to the two fastening holes of the flow tube and run through by a plurality of fastening elements to fasten to the fastening holes.

11. The flow meter of claim 1, wherein the flow tube includes scales formed on the first lateral surface.

* * * * *